United States Patent [19]
Wang

[11] Patent Number: 6,002,935
[45] Date of Patent: Dec. 14, 1999

[54] WIRELESS COMMUNICATIONS CELLULAR ARCHITECTURE FOR IMPROVING COMMUNICATIONS RESOURCE ALLOCATION

[75] Inventor: Li-Chun Wang, Eatontown, N.J.

[73] Assignee: AT&T Corp, New York, N.Y.

[21] Appl. No.: 08/862,095

[22] Filed: May 22, 1997

[51] Int. Cl.⁶ .................................................. H04Q 7/36
[52] U.S. Cl. .......................................... 455/447; 455/446
[58] Field of Search .................................. 455/446, 447, 455/423

[56] References Cited

U.S. PATENT DOCUMENTS

| | | | |
|---|---|---|---|
| 5,247,699 | 9/1993 | Hartman | 455/447 |
| 5,365,571 | 11/1994 | Rha et al. | 455/447 |
| 5,483,667 | 1/1996 | Faruque | 455/447 |
| 5,640,674 | 6/1997 | Dixon | 455/447 |
| 5,734,983 | 3/1998 | Faruque | 455/446 |
| 5,845,209 | 12/1998 | Iwata | 455/423 |

FOREIGN PATENT DOCUMENTS

| | | |
|---|---|---|
| WO91/03911 | 3/1991 | WIPO . |
| WO96/04761 | 2/1996 | WIPO . |
| WO96/34505 | 10/1996 | WIPO . |

*Primary Examiner*—Reinhard J. Eisenzopf
*Assistant Examiner*—Duc Nguyen

[57] ABSTRACT

A method and apparatus for communications resource allocation in a wireless communications system having a total system bandwidth. A service area is divided into a plurality sectors. A first set of base station antennas are positioned within a first set of sectors. The first set of antennas have main beams set at a first set of angles, and each antenna corresponds to a sector within the first set of sectors. A second set of base station antennas are positioned within a second set of sectors adjacent to the first set of sectors. The second set of antennas have main beams set at a second set of angles, and each antenna corresponds to a sector within the second set of sectors. Each sector is assigned a portion of the total system bandwidth.

8 Claims, 9 Drawing Sheets

K = 4

K = 7

K = 12

$K = i^2 + ij + j^2 = 19$

NBTC (TYPE-I)

NBTC (TYPE-II)

WIRELESS COMMUNICATIONS CELLULAR ARCHITECTURE FOR IMPROVING COMMUNICATIONS RESOURCE ALLOCATION

FIELD OF THE INVENTION

The invention relates to wireless systems. More particularly, the invention relates to a method and apparatus for assigning communications resources for a wireless communications system.

BACKGROUND OF THE INVENTION

The demand for wireless communications services is on the rise. Cellular telephones are becoming as common as office and residential telephones. Personal Communications Service (PCS) offers the potential to improve existing cellular communications dramatically. Wireless high-speed broadband packet services hold promise for a whole host of new services for work-at-home, telecommuting, local and Internet access.

As a result of the increased popularity of wireless communications services, bandwidth demands for wireless systems providing these services have increased accordingly. Bandwidth refers to the difference between the two limiting frequencies of a band expressed in Hertz (Hz). Bandwidth is a key limiting factor in determining the capacity of the system. The term "capacity" loosely refers to the number of users a system can service, or the amount of information a system can transmit to a user at any one time.

A traditional solution for increasing the bandwidth efficiency in wireless systems is through frequency reuse. Frequency reuse refers to reusing a common frequency band in different cells within the system. The concept of frequency reuse will be discussed in more detail with reference to FIGS. 1 and 2.

FIG. 1 is a diagram of a typical wireless communication system suitable for practicing the present invention. FIG. 1 shows a base station 20 in wireless communication with terminal stations 22. Base station is connected to a Mobile Switching Center (MSC) 26. MSC 26 can be connected to a fixed network, such as the public switched telephone network (PSTN) 24 shown in FIG. 1 or the Internet (not shown). MSC 26 may also be connected to other base stations (not shown). Terminal stations 22 can be either fixed or mobile.

Base station 20 communicates information to/from terminal stations 22 using radio signals transmitted over a range of carrier frequencies. Frequencies represent a finite natural resource, and are in high demand. Moreover, frequencies are heavily regulated by both Federal and State governments. Consequently, each cellular system has access to a very limited number of frequencies. Accordingly, wireless systems attempt to reuse frequencies in as many cells within the system as possible.

To accomplish this, a cellular system uses a frequency reuse pattern. A frequency reuse pattern is determined by taking the total frequency spectrum allotted to the system and dividing it into K sets of frequencies, with each cell having access to one set of frequencies. For example, if the system were allocated 70 MHZ of frequency spectrum, and there were 7 sets of frequencies (K=7), each set would include 10 MHZ worth of the 70 MHZ available to the system (assuming a uniform distribution). Thus, each cell would have access to 10 MHZ Worth of the total frequency spectrum allotted to the system.

FIGS. 2(A) through 2(D) illustrate examples of frequency reuse patterns corresponding to K=4, 7, 12 and 19, respectively. A cellular communication system has a number of communication sites located throughout the geographic area served by the system. As shown in FIGS. 2(A) through 2(D), a geographic area can be organized into cells and/or sectors, with each cell typically containing a plurality of communication sites such as a base station and terminal stations. A cell is represented in FIGS. 2(A) through 2(D) as a hexagon. FIG. 2(A) shows a frequency reuse pattern where K=4. Cells are placed into groups of four (referred to as a "cluster"), with each cluster employing one of the frequency sets 1 through 4 (the number within each cell in FIG. 2(A) represents a set of frequencies). This cluster of four cells is then repeated until the entire service area is covered. This same pattern is shown in FIGS. 2(B), 2(C) and 2(D) for clusters of 7, 12 and 19 cells, respectively.

In view of the above, it can be appreciated that the larger the frequency reuse factor (i.e., K), the smaller amount of frequency is available to each cell. This limits the overall capacity of the system, for example, by limiting the number of terminal stations that can communicate within a cell, or the data rates at which each terminal station can send and receive information. Consequently, to the extent that the frequency reuse factor (i.e., K) can be lowered, the more capacity the system has to offer wireless communications services.

A major factor in designing a frequency reuse pattern is the attempt to maximize system capacity while maintaining an acceptable signal-to-interference ratio (SIR). SIR refers to the ratio of the level of the received desired signal to the level of the received undesired signal. Most of the undesired signal is due to co-channel interference. Co-channel interference is interference due to the common use of the same frequency band by two different cells. Thus, to a large extent, co-channel interference determines how often a set of frequencies may be reused throughout the entire system. Accordingly, to the extent co-channel interference can be minimized, the lower the frequency reuse factor (i.e., K).

In an attempt to minimize co-channel interference, conventional systems have separated each cell into multiple sectors, with each sector having a directional antenna co-located with a base station at the center of the cell. The beamwidth of each base station antenna is normally wide enough to cover the whole sector. Typically, a cell is divided into three sectors with each sector having a 120 degree antenna. These cell configurations, however, are unsatisfactory for a number of reasons, which are described with reference to FIGS. 3, 4, and 5.

FIG. 3 is a diagram of a conventional three-sector cell. The cell is represented as a hexagon, with solid lines representing hypothetical cell contours. The term "cell contours" refers to the outline of a cell as well as the lines within a cell which define a sector. The cell has a base station located at the center of the cell, with a directional antenna covering each sector of the cell. The beamwidth of each base station antenna is 120 degrees. The analytical cell contours (i.e., coverage area for each antenna transmission beam) is represented by non-solid lines. As shown in FIG. 3, the analytical cell contours for the front lobe of the antenna transmission beam for sector 1 ("originating sector") forms the shape of an oval. The hypothetical cell contours for sector 1, however, forms the shape of a diamond. As a result, it can be appreciated that the analytical cell contours do not match the hypothetical cell contours. Consequently, the analytical cell contours overlap into the sectors 2 and 3 which are adjacent to sector 1, thereby interfering with the antenna transmission beams for sectors 2 and 3. This type of cell configuration is referred to hereinafter as a wide-beam trisector cell (WBTC).

FIG. 4 illustrates a frequency reuse pattern with K=4 using conventional three-sector cells. Cells are placed into a cluster of four, with each cluster employing one of the frequency sets 1 through 4. This cluster of four cells is then repeated until the entire service area is covered. It can be appreciated that if each cell is a WBTC, the analytical cell contours illustrated in FIG. 3 will overlap not only with sectors adjacent to the originating sector within the same cell, but also to sectors adjacent to the originating sector in other cells (hereinafter collectively referred to as "adjacent sectors"). The increased interference caused by overlapping transmissions increases the frequency reuse factor, thereby decreasing overall cell and system capacity. FIG. 4 also illustrates that the distance (D) between each base station using conventional three-sector cells is 3.5 times the radius (R) of each cell.

FIG. 5 shows the cellular system using the frequency reuse pattern described with reference to FIG. 4 with an additional tier of cells creating co-channel interference for a sector labeled sector 4 located in the middle of the diagram ("FIG. 5 target sector"). FIG. 5 shows the FIG. 5 target sector receiving co-channel interference from four cells, labeled A, B, C and D. This interference, in part, explains why the frequency reuse factor for a conventional system using three sectors is typically K=7.

In light of the foregoing, it can be appreciated that a substantial need exists for a cellular architecture that minimizes the co-channel interference for adjacent sectors and cells, thereby decreasing the frequency reuse factor for a system, thereby increasing the overall capacity of the system.

SUMMARY OF THE INVENTION

These needs and other needs are met by a method and apparatus for communications resource allocation in a wireless communications system having a total system bandwidth. A service area is divided into a plurality sectors. A first set of base station antennas are positioned within a first set of sectors. The first set of antennas have main beams set at a first set of angles, and each antenna corresponds to a sector within the first set of sectors. A second set of base station antennas are positioned within a second set of sectors adjacent to the first set of sectors. The second set of antennas have main beams set at a second set of angles, and each antenna corresponds to a sector within the second set of sectors. Each sector is assigned a portion of the total system bandwidth. This arrangement decreases the frequency reuse factor to K=2 while maintaining acceptable quality of service (QoS) requirements.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention comprises a cellular architecture and communications resource allocation method and apparatus that significantly reduces a frequency reuse factor for a wireless communications system. The capacity of a conventional cellular system is inversely proportional to the frequency reuse factor (i.e., K) for the system. A frequency reuse factor for conventional systems is typically K=7. The present invention reduces the frequency reuse factor to K=2, thereby tripling the capacity of many existing cellular systems, while maintaining acceptable quality of service (QoS) requirements.

A frequency reuse factor of K=2 is achieved using the following concepts. An advantageous embodiment of the invention uses a narrow beam trisector cell (NBTC) versus that of a wide beam trisector cell (WBTC) used in conventional systems. A NBTC uses an antenna for each sector having roughly half the beamwidth used in a WBTC. The base station antennas with smaller beamwidths used in a NBTC generate an analytical cell contour that approximates the hypothetical cell contour for each sector. NBTC, therefore, decreases the amount of transmissions from an originating sector that overlap into adjacent sectors. In addition, this embodiment of the invention uses sector rotation to decrease co-channel interference between sectors. Sector rotation minimizes co-channel interference from other cells.

The combination of sector rotation and NBTC yields a frequency reuse factor of K=2. This embodiment of the invention utilizes a cluster of four cells, each having three sectors. The total spectrum available to the system is separated into 6 frequency sets. Each frequency set is used for a single sector, and is reused by a sector in an adjacent cell. As a result, for every cluster of 4 cells, all 6 frequency sets are used twice, thereby creating a frequency reuse factor of K=2.

Figure 6:
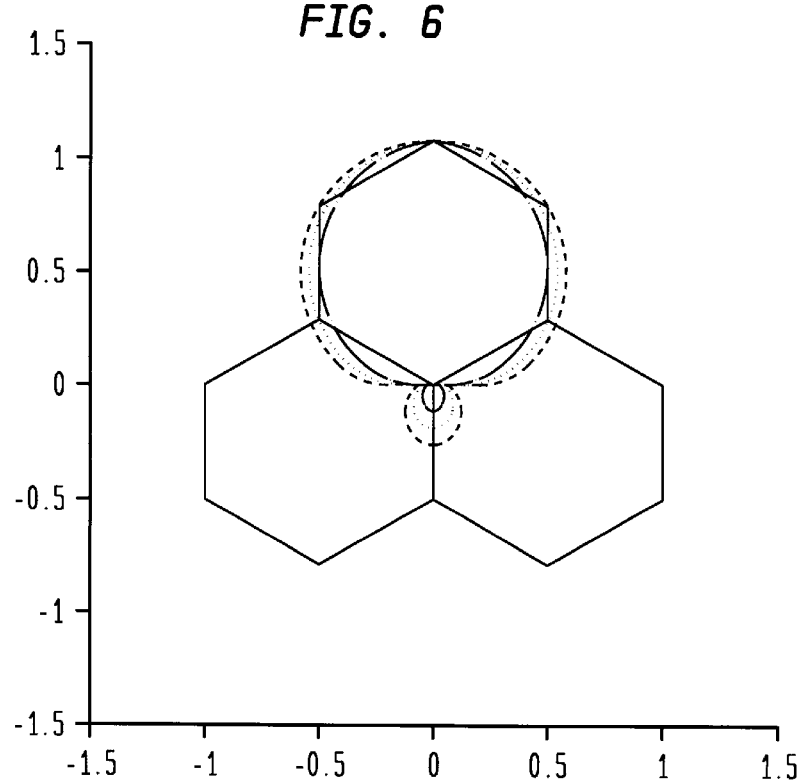
FIG. 6 a three sector cell in accordance with one embodiment of the present invention.

Referring now in detail to the drawings wherein like parts are designated by like reference numerals throughout, there is illustrated in FIG. 6 a three sector cell in accordance with an embodiment of the present invention. As shown in FIG.

Figure 1:
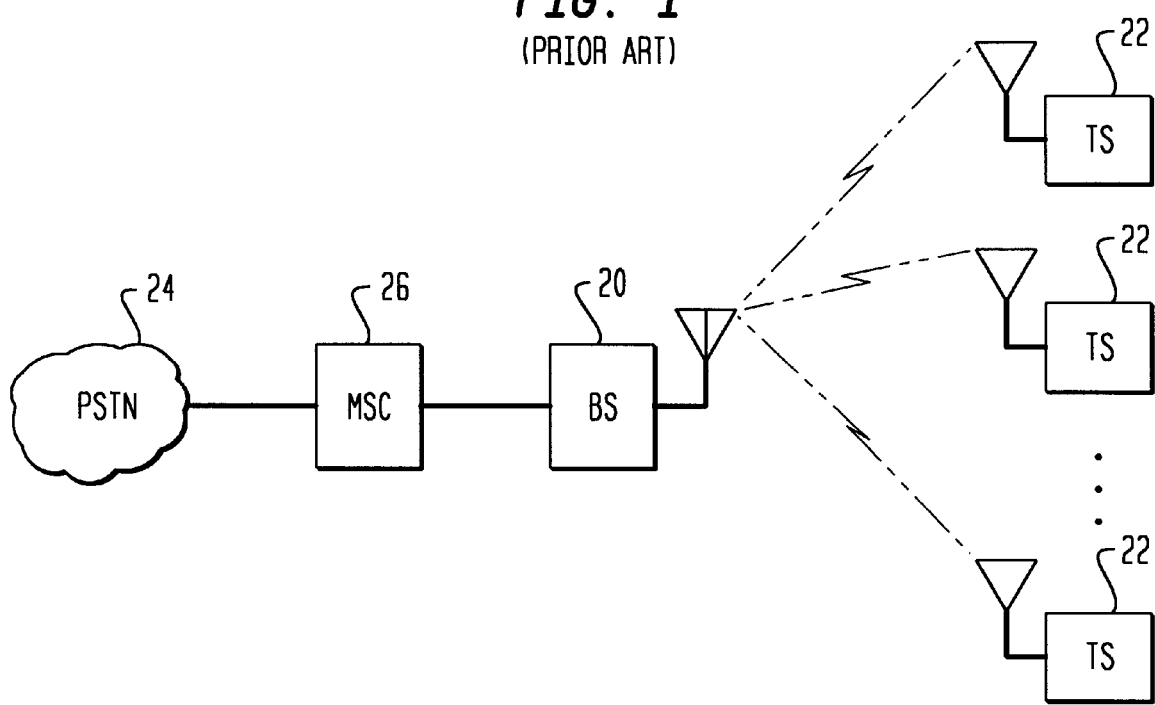
FIG. 1 is a diagram of a typical wireless communication system suitable for practicing the present invention.
Figure 2A:
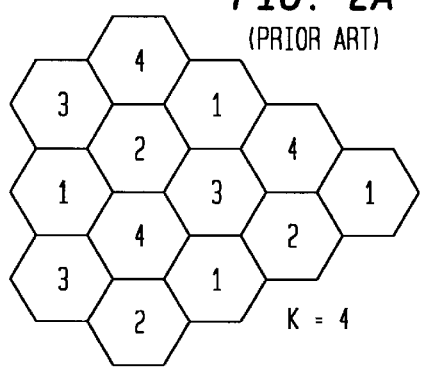
FIGS. 2(A) through 2(D) illustrate examples of frequency reuse patterns corresponding to X=4, 7, 12 and 19, respectively.
Figure 2B:
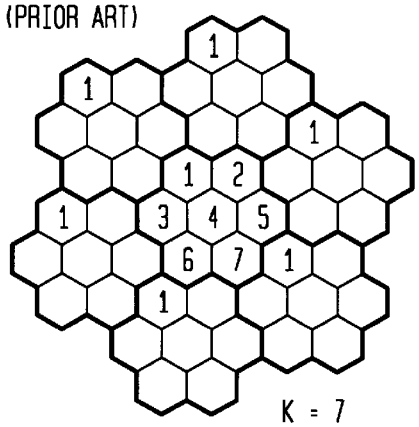
Figure 2C:
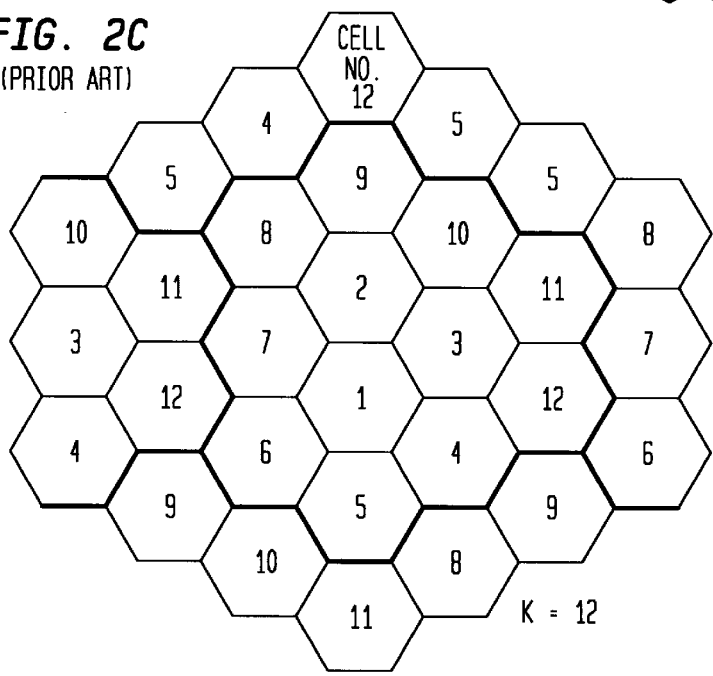
Figure 2D:
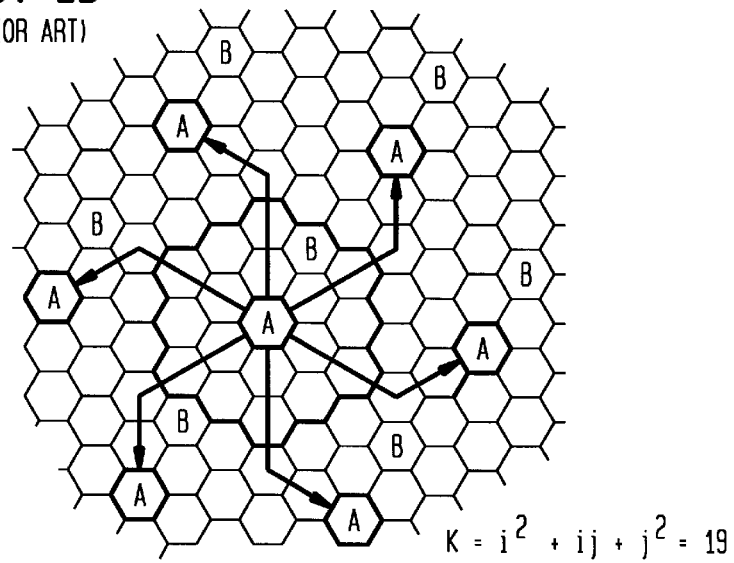
Figure 3:
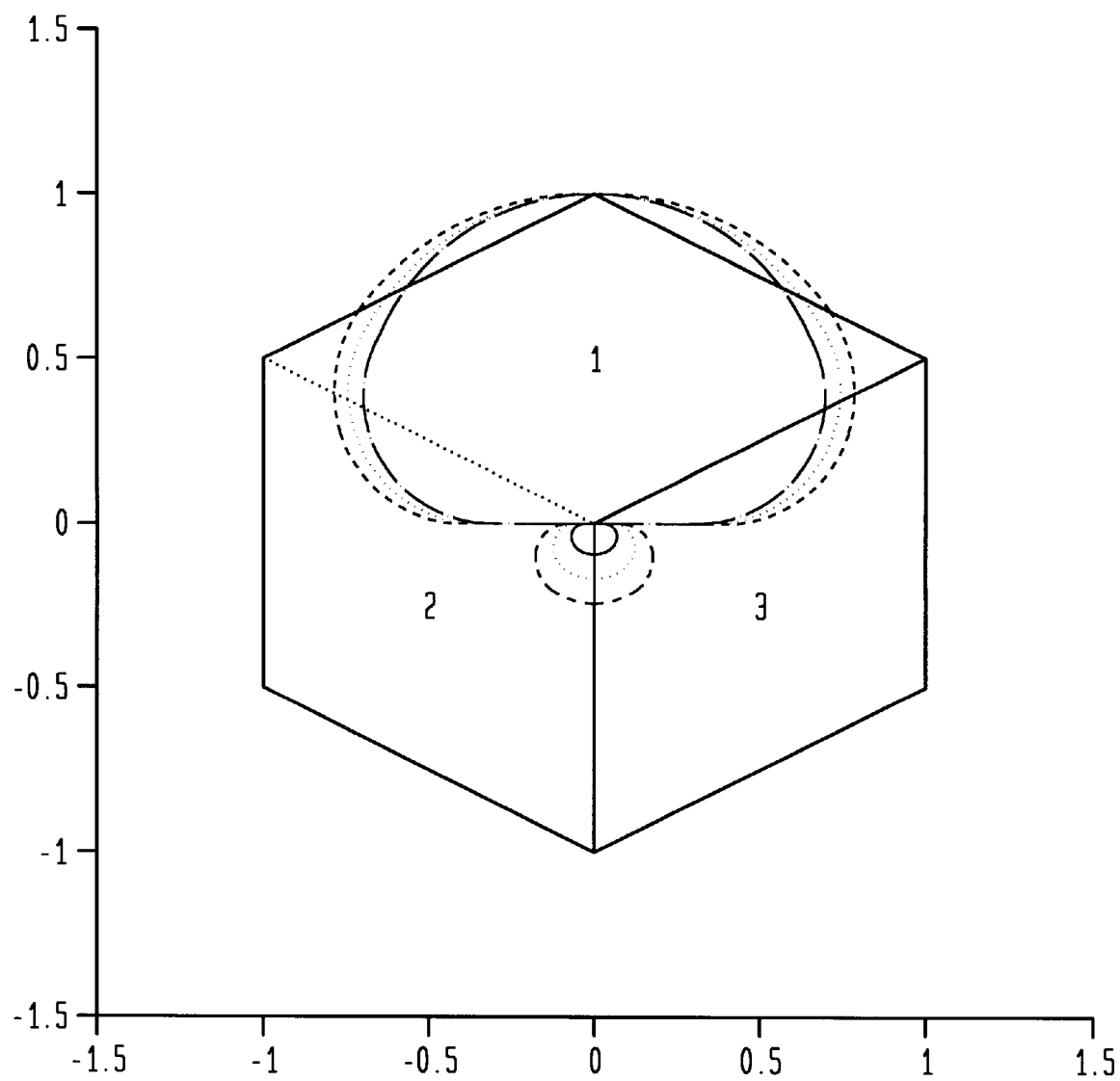
FIG. 3 is a diagram of a conventional three-sector cell.

6, a hexagon is used to represent the hypothetical contours of a sector rather than an entire cell as in conventional systems. The reason a hexagon is used to represent a sector rather than the entire cell is because a base station antenna may be selected that produces a main transmission beam that better conforms to the shape of a hexagon, rather than a diamond used in conventional systems (as shown in FIG. 3).

More particularly, in this embodiment of the invention, three hexagons are used to represent an entire cell. The hypothetical cell contours are represented as solid lines. The cell has a base station located at the center, with a directional antenna covering each sector of the cell. The beamwidth of each base station antenna is approximately 60 degrees, or roughly half of that used by conventional systems. The analytical cell contours are represented by non-solid lines. As shown in FIG. 6, the analytical cell contour for the front lobe of the antenna transmission beam for sector 1 forms the shape of an oval. Since the hypothetical cell contours for sector 1 is in the form of a hexagon, the analytical cell contours roughly approximate the hypothetical cell contours. As a result, it can be appreciated that the analytical cell contours produce less interference for adjacent sectors as compared to conventional systems using WBTC. This type of cell configuration is referred to hereinafter as a narrow-beam trisector cell (NBTC).

Figure 4:
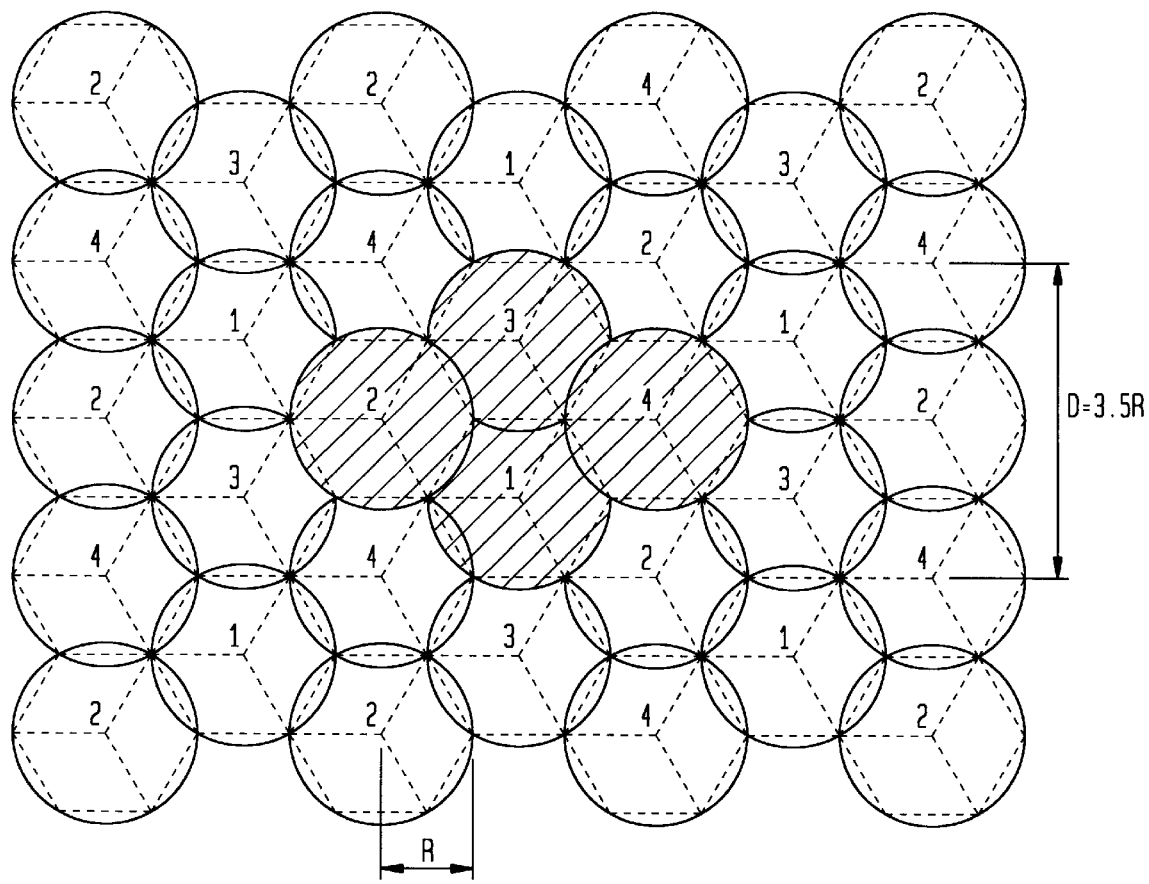
FIG. 4 illustrates a frequency reuse pattern with K4 using conventional three-sector cells.
Figure 7:
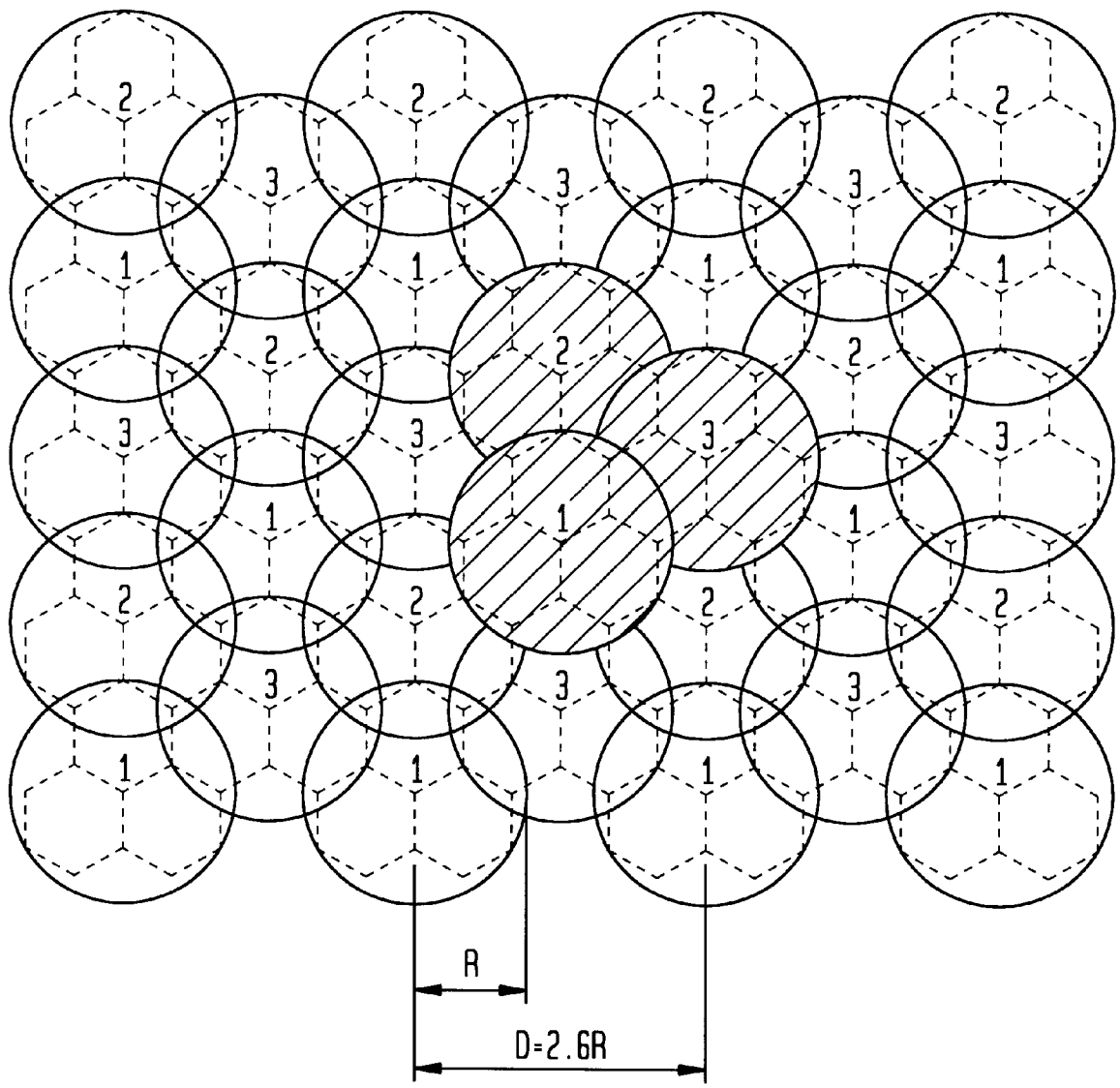
FIG. 7 is a frequency reuse pattern using NBTC in accordance with one embodiment of the present invention.

FIG. 7 is a frequency reuse pattern using NBTC in accordance with a first embodiment of the present invention. As shown in FIG. 7, the distance (D) between each NBTC base station Is D=2.6 radius (R), which is less than the distance found in conventional systems such as the one described with reference to FIG. 4 (i.e., D=3.5 R). The decrease in D is a result of the unique configuration of each NBTC which utilizes a hexagon for each sector, thereby permitting the interlocking hexagon sectors to fit close together to create a "tighter" cell pattern. The tighter cell pattern increases the number of cells needed to cover the service area of the system, which in turn increases the number of times a frequency set may be reused, thereby increasing the overall capacity of the system.

Figure 8A:
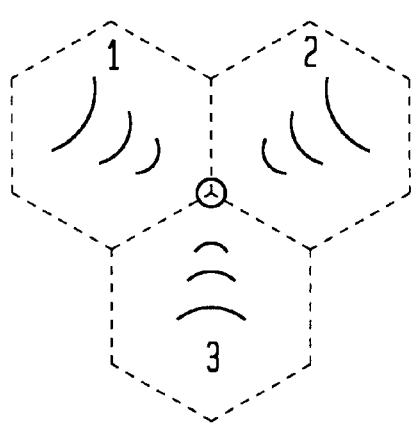
FIG. 8(A) illustrates a first type of NBTC configuration referred to as "NBTC Type-I" in accordance with one embodiment of the present invention.
Figure 8B:
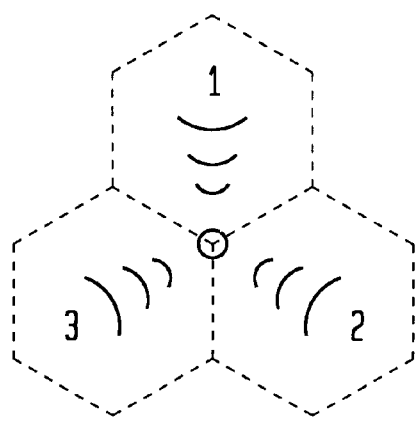
FIG. 8(B) illustrates a second type of NBTC configuration referred to as "NBTC Type-II" in accordance with one embodiment of the present invention.

FIGS. 8(A) and 8(B) illustrate two types of NBTC used in accordance with one embodiment of the invention. FIG. 8(A) illustrates a first type of NBTC configuration referred to as "NBTC Type-I". NBTC Type-I is a cell having three sectors labeled sector 1, sector 2 and sector 3, with each sector being serviced by a directional base station antenna having angles on the main beam of 30 degrees, 150 degrees and 270 degrees, respectively. FIG. 8(B) illustrates a second type of NBTC configuration referred to as "NBTC Type-II". NBTC Type-II is a cell having three sectors labeled sector 1, sector 2 and sector 3, with each sector being serviced by a directional base station antenna having angles on the main beam of 90 degrees, 210 degrees and 330 degrees, respectively. The directional base station antennas all have a beamwidth of approximately 60 degrees to 70 degrees, which is approximately half the beamwidth of 100 degrees to 120 degrees used in conventional systems.

It can be appreciated that the antenna angles for NBTC-II are rotated clock-wise approximately 60 degrees from the antenna angles used in NBTC-I. This rotation permits each cell to interlock and ensure complete coverage of the service area while minimizing the distance (D) between NBTC base stations, as discussed in more detail with reference to FIG. 9.

Figure 9:
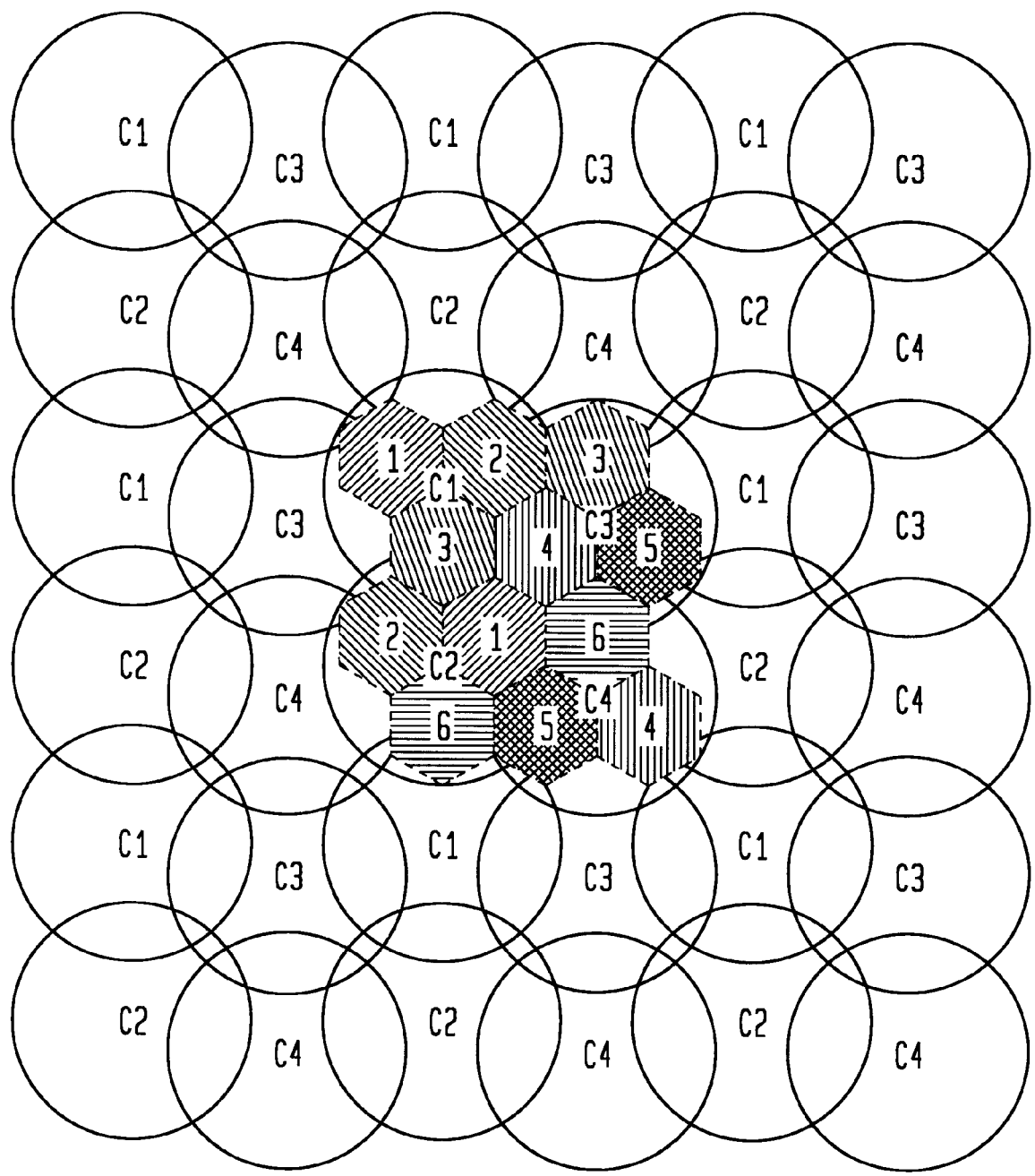
FIG. 9 is a frequency reuse pattern of K=2 using NBTC in accordance with one embodiment of the present invention.

FIG. 9 is a frequency reuse pattern of K=2 using NBTC in accordance with a first embodiment of the present invention. This embodiment of the invention utilizes a cluster of four cells labeled C1, C2, C3 or C4. Each cell has three sectors. The total spectrum available to the system is separated into 6 frequency sets. Each sector is assigned a single frequency set from 1 to 6, with each frequency set being reused a second time by a sector in an adjacent cell. As a result, for every cluster of 4 cells, all 6 frequency sets are used twice, thereby creating a frequency reuse factor of K=2.

As shown in FIG. 9, in this embodiment of the invention cell the sectors for cell C1 are assigned frequency sets 1, 2 and 3, the sectors for cell C2 are assigned frequency sets 2, 1 and 6, the sectors for cell C3 are assigned frequency sets 3, 5 and 4, and the sectors for cell C4 are assigned frequency sets 6, 4 and 5. The resulting pattern ensures that there is at least one sector between sectors utilizing the same frequency set, thereby minimizing co-channel interference between sectors. This pattern also ensures that each frequency set is used twice for every cluster of 4 cells, and is repeated throughout the service area for the system. Therefore, on the average, this embodiment of the invention makes every two base stations utilize the whole spectrum, i.e., K=2.

Figure 5:
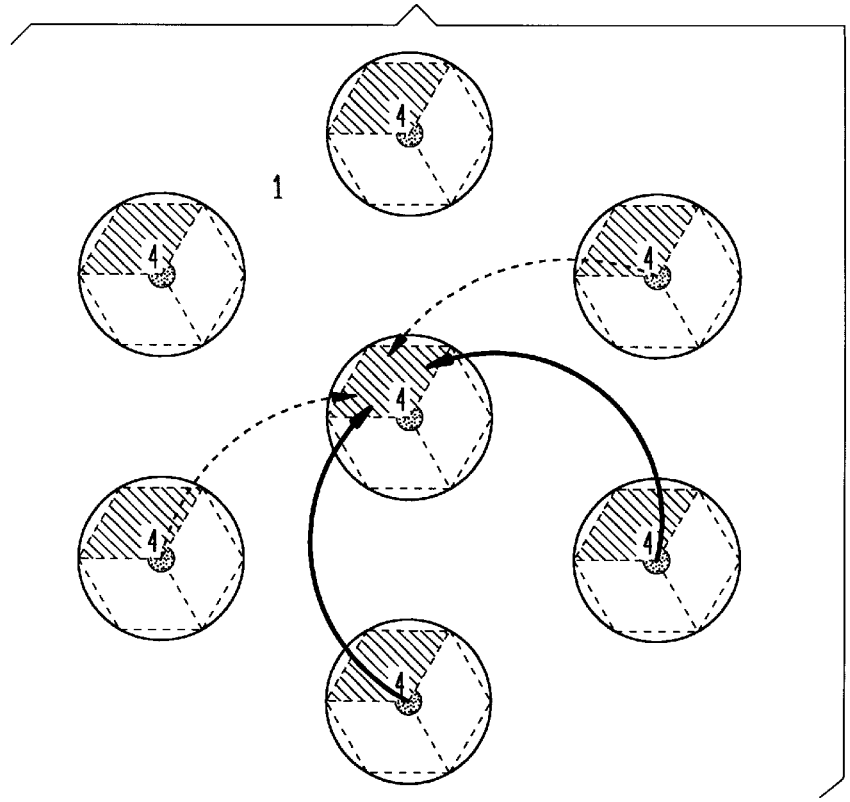
FIG. 5 shows the cellular system using the frequency reuse pattern described with reference to FIG. 4 with an additional tier of cells creating co-channel interference for a sector labeled sector 4 located in the middle of the diagram.
Figure 10:
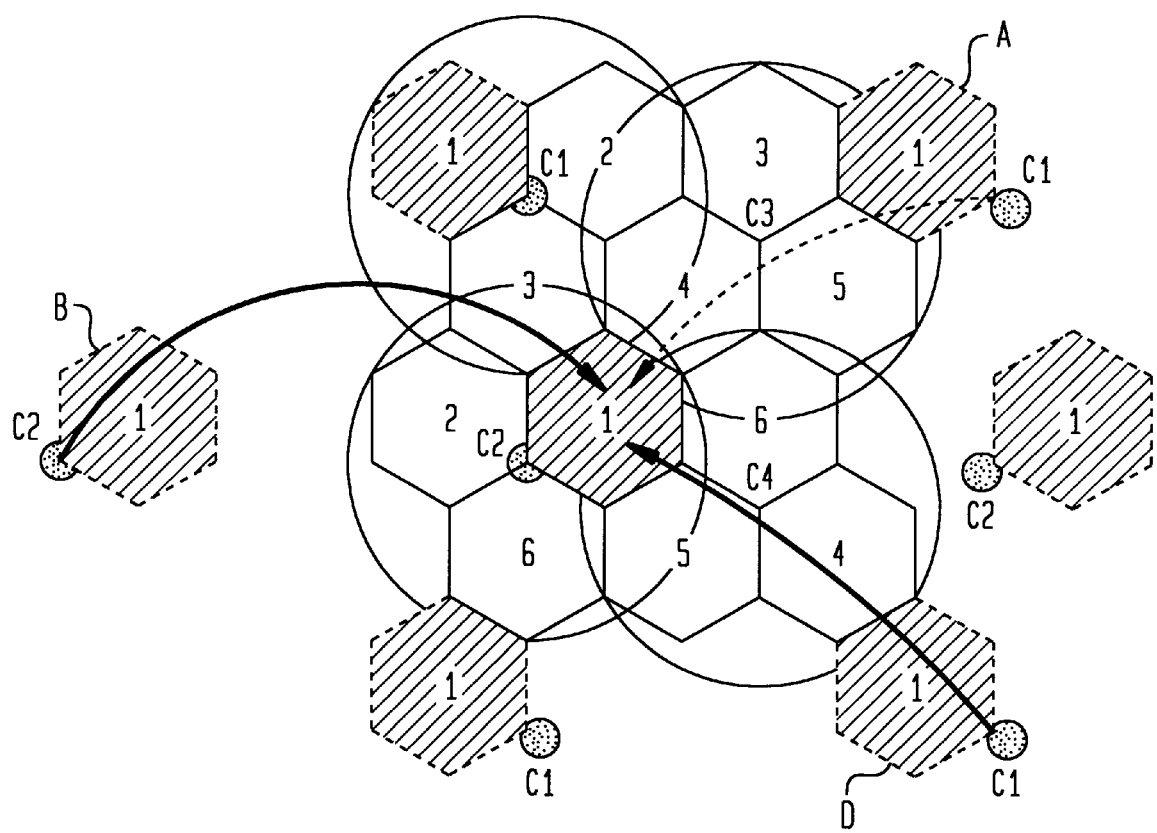
FIG. 10 shows the cellular system of FIG. 9 with an additional tier of cells creating co-channel interference for a sector using frequency set 1 located in the middle of the diagram.

FIG. 10 shows the cellular system of FIG. 9 with an additional tier of cells creating co-channel interference for a sector using frequency set 1 located in the middle of the diagram ("FIG. 10 target sector") FIG. 10 shows the target sector receiving co-channel interference from three cells, labeled A, B and D. By way of contrast, conventional systems using three sector cells and wide-beam antennas (i.e., 120 degrees) receive co-channel interference from at least four other cells, as shown in FIG. 5. Thus, a cellular system using NBTC receives less interference from other cells within the system, thereby helping to achieve a frequency reuse factor of K=2.

Although various embodiments are specifically illustrated and described herein, it will be appreciated that modifications and variations of the present invention are covered by the above teachings and within the preview of the appended claims without departing from the spirit and intended scope of the invention. For example, although specific angles for the main beam of the base station antennas are given, it can be appreciated that various angles fall within the scope of the invention. Similarly, although ranges of beamwidths for use with the base stations antennas are given, it can be appreciated that any beamwidth approximating the hypothetical cell contours given for various embodiments of the present invention also falls within the scope of the invention.

What is claimed is:

1. A method for allocating communications resources in a communications system, comprising the steps of:

dividing a service area into four cells, with each cell having three sectors;

providing a first set of antennas for said first cell, said first set of antennas having main beams set at a first set of angles with beamwidths of fifty to seventy degrees;

providing a second set of antennas for said second cell, said second set of antennas having main beams set at a second set of angles with beamwidths of fifty to seventy degrees, with said second set of angles rotated fifty to seventy degrees from said first set of angles; and separating said communications resources into six channel sets;

assigning to each sector a portion of the communications resources by:

assigning channel sets one, two and three to sectors one, two and three of cell one, respectively;

assigning channel sets two, one and six to sectors one, two and three of cell two, respectively;

assigning channel sets three, four and five to sectors one, three and two of cell three, respectively; and assigning channel sets six, five and four to sectors one, three and two of cell four, respectively.

2. The method of claim 1, wherein said first set of angles are 30 degrees, 150 degrees and 270 degrees, and said second set of angles are 90 degrees, 210 degrees and 330 degrees.

3. The method of claim 1, wherein said system has a frequency reuse factor of K=2.

4. The method of claim 1, wherein said step of assigning comprises:

determining a quality of service requirement; and assigning each sector a portion of the communications resource in accordance with said quality of service requirement.

5. A communications system, said system having a service area divided into at least a first and second cell, with each cell having at least three sectors, comprising:

a switching network to provide switching for a plurality of base stations;

a plurality of base stations each operably coupled to said switching network to receive signals over said network, each base station having a set of antennas defining at least three sectors for the cell, said set of antennas having main beams set at a set of angles with beadwidths of fifty to seventy degrees the set of angles of each base station rotated fifty to seventy degrees with respect to the set of angles of a neighboring base station, wherein channel resources of the service area include at least six channel sets and, for four of the base stations:

channel sets one, two and three are associated with the three sectors of a first base station, channel sets two, one and six are associated with the three sectors of a second base station, channel sets three, four and five are associated with the three sectors of the third base station, and channel sets six, five and four are associated with the three sectors of the fourth base station; and a transceiver for each base station, said transceiver operably coupled to each antenna for communicating said signals over said main beams of said antennas.

6. The apparatus of claim 5, wherein said first set of angles are 30 degrees, 150 degrees and 270 degrees, and said second set of angles are 90 degrees, 210 degrees and 330 degrees.

7. The apparatus of claim 6, wherein said system has a frequency reuse factor of K=2.

8. A communication system, the system having a service area populated by at least four cell sites each having at least three sectors, the system comprising a transceiver at each cell site, the transceiver including a set of antennae providing communications at the respective cells using main beams at a first set of angles with beamwidths of fifty to seventy degrees, wherein channel resources of the service area include at least six channel sets and, for four of the base stations, channel sets one, two and three are associated with the three sectors of a first base station, channel sets two, one and six are associated with the three sectors of a second base station, channel sets three, four and five are associated with the three sectors of the third base station, and channel sets six, five and four are associated with the three sectors of the fourth base station.

* * * * *